United States Patent [19]
Flavell

[11] 3,938,890
[45] Feb. 17, 1976

[54] TORQUE TRANSDUCER UTILIZING DIFFERENTIAL OPTICAL SENSING

[76] Inventor: Evan R. Flavell, P.O. Box 6397, Albany, Calif. 94706

[22] Filed: Oct. 15, 1974

[21] Appl. No.: 514,997

[52] U.S. Cl............ 356/119; 73/136 A; 250/231 R
[51] Int. Cl.². .... G01J 4/04; G01L 3/04; G01L 3/12
[58] Field of Search ................. 250/231 R, 231 SE; 356/119; 73/136 A

[56] References Cited
UNITED STATES PATENTS

| | | | |
|---|---|---|---|
| 2,938,378 | 5/1960 | Canada et al................. | 350/272 X |
| 2,945,167 | 7/1960 | Gunther........................ | 250/231 SE |
| 3,474,255 | 10/1969 | White .......................... | 250/225 |
| 3,495,452 | 2/1970 | Johnson et al................ | 250/231 R |
| 3,596,100 | 7/1971 | Hollick ......................... | 250/225 X |

*Primary Examiner*—Robert Segal
*Attorney, Agent, or Firm*—Owen, Wickersham & Erickson

[57] ABSTRACT

Torque stress on a stationary or rotating shaft is measured in a contactless fashion utilizing differential optical sensing means. A pair of light-controlling discs are attached to opposite ends of a torsioning section of the shaft. The combination of light-valving discs comprises two areas, inner and outer, with complimentary light transmission control effects in response to differential angular rotation of the discs with respect to each other. Light is passed through the combination of discs and received by sensors aligned such that separate signals are generated from light passed through the inner and outer areas of the light-controlling discs. As torque is applied to the shaft in one direction, more light is transmitted through the one area, and less through the other. As torque is applied in the opposite direction, the opposite effect occurs. Over angles of such differential rotation of the discs, a stable signal is produced by the sensors that is proportional to the applied torque. Ring-configuration sensors, multiple sensor pairs, or optical distribution and collection means are utilized, as required, to minimize the effects of imperfections in the light transmission control materials, and thereby maximize the system signal-to-noise ratio.

16 Claims, 7 Drawing Figures

TORQUE TRANSDUCER UTILIZING DIFFERENTIAL OPTICAL SENSING

BACKGROUND OF THE INVENTION

The present invention relates generally to torque metering apparatus, and more particularly, to improvements in approaches involving sensing of the differential angular displacement of opposite ends of a torsioning shaft section.

Direct measurement of the torsional stress applied to a shaft via conventional strain-gauge technology suffers the significant disadvantage of the elaborate means required to extract the electrical torque signal from the rotating transducers. Slip-rings and brushes commonly used are expensive, deteriorate with age, and are susceptible to noise generated by contamination of the apparatus. Rotating transformer approaches, while eliminating the problems inherent in slip-rings, require considerable and expensive external excitation and detection circuitry to extract the strain-gauge signal, which, itself, often requires additional amplification before use, for example, in driving a panel meter.

Contactless indirect torque measurement means utilizing optical sensing of the angular displacement of opposite ends of torsioning shaft section have previously been devised, and most offer simplicity of construction and consequential low cost as advantages over the conventional direct-measurement approaches above. None of these devices, however, combines all of the features desired in a practical and inexpensive torque transducer. Specifically, it is a primary object of this invention to improve upon devices of the type described in U.S. Pat. Nos. 3,495,452 and 3,596,100 to C. E. Johnson, et al., and R. W. Hollick respectively. These devices utilize the subject optical sensing approach, however, are limited in their application and economy due to inherent necessity to frequently compensate for variations in light source intensity, and, in the one case, elaborate external compensation required for inherent non-linearity.

Therefore, among the objects of the present inventions are the provisions of a torque transducer utilizing differential optical sensing means wherein:

a. an electrical signal output is developed proportional to applied shaft torque with a minimum uncompensated non-linearity, and,
b. said signal output is insensitive to changes in transducer light source intensity due to variations in excitation voltage or aging,
c. while, at the same time, additional desirable performance and construction features are not compromised.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention employing the same or equivalent principles may be used and structural changes may be made as desired by those skilled in the art without departing from the present invention and the purview of the appended claims.

SUMMARY OF THE INVENTION

In the present invention, torque stress on a stationary or rotating shaft is measured in a contactless fasion utilizing differential optical sensing means. A pair of light-controlling discs are attached to opposite ends of a torsioning section of the shaft. The combination of light-valving discs comprise two areas, inner and outer, with complimentary light transmission control effects in response to differential angular rotation of the discs with respect to each other. Light is passed through the combination of discs and received by sensors aligned such that separate signals are generated from light passed through the inner and outer areas of the light-controlling discs. As torque is applied to the shaft in one direction, more light is transmitted through the one area, and less through the other. As torque is applied in the opposite direction, the opposite effect occurs. Over small angles of such differential rotation of the discs, a stable signal is produced by the sensors that is proportional to the applied torque. Ring-configuration sensors, multiple sensor pairs, or optical distribution and collection means are utilized, as required, to minimize the effects of imperfections in the light transmission control materials, and thereby maximize the system signal-to-noise ratio.

In a particular embodiment of the present invention, the light-controlling discs are constructed of optical polarizing material. One disc comprises two rings, inner and outer, with polarization 90° to each other. The second disc has a single polarization aligned 45° to that of both rings of the first disc. The sensors are photoresistors and are connected in one leg of a bridge circuit. The other leg of the bridge circuit uses fixed resistors, and a center-null meter is connected across the two legs of the bridge to read the direction and amount of the torque applied. In the bridge leg having the photoresistors, the photoresistors which measure the light transmitted through the inner ring are connected in series with the photoresistors which measure the light through the outer ring. In one form of this embodiment, a plurality of photoresistors are used for measuring the light transmitted through each of the two rings. By positioning the photoresistors for each ring at a number of circumferentially spaced positions and by connecting all of the photoresistors for each ring in parallel, the signal-to-noise ratio of the transducer is maximized.

In another particular embodiment of the present invention, the light-controlling discs have a light-dividing pattern comprising a series of alternately occurring light-transmitting and opaque areas. One disc comprises two rings of such areas, inner and outer, offset one area with respect to each other. The second disc has a single such area aligned with an offset of one-half area with respect to both rings of the first disc. The sensors are of the photo-voltaic type and are connected to operational amplifiers in a differential configuration, and a center-null meter is connected across the amplifier outputs to read the direction and amount of torque.

Torque transducer apparatus and methods which incorporate the structure and techniques described above and which are effective to function as described above constitute specific objects of this invention.

Other objects, advantages, and features of my invention will become apparent from the following detailed description of preferred embodiments taken with the accompanying drawings.

DESCRIPTION OF THE PREFERRED EMBODIMENTS

Figure 1:
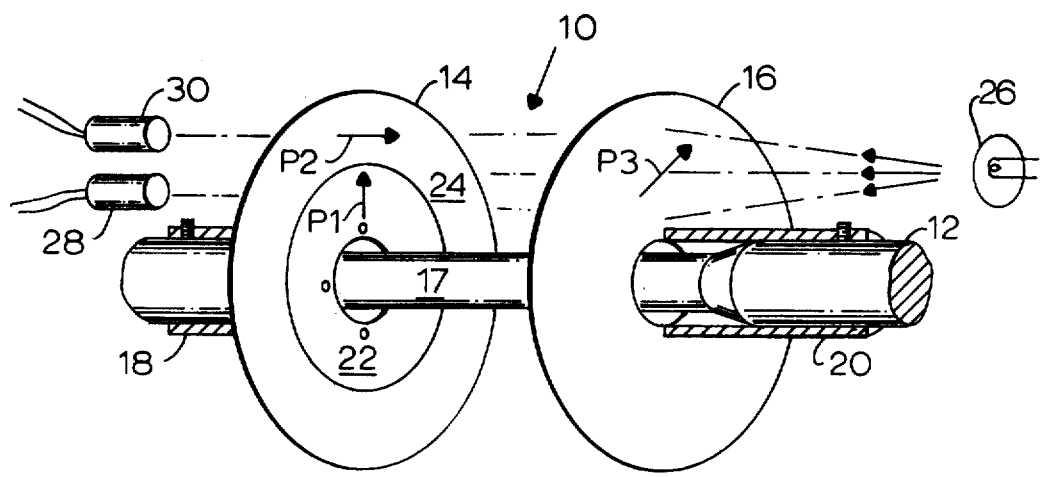
FIG. 1 is an exploded perspective view of an embodiment of the invention utilizing a single light source and a single sensor pair.

A torque transducer for measuring in a shaft and constructed in accordance with one embodiment of the present invention is indicated generally by the reference numeral 10 in FIG. 1.

The torque transducer 10 comprises a torque shaft 12 which may be stationary or rotating.

Two light transmission controlling discs 14 and 16 are attached to opposite ends of a torsioning section 17 of the shaft by mounting hubs 18 and 20. The length, diameter, and materials of the torsioning section 17 determine the torque range of the device.

The disc 14 comprises two areas, an inner area 22 and an outer area 24, with complimentary light transmission control effects in response to differential angular rotation with respect to and in combination with the second disc 16.

The second disc 16 is aligned in such a manner with respect to the first disc 14 that, with no torque applied to the shaft 12, the optical transmission through both areas 22 and 24 of the first disc 14 and the second disc 16 are approximately equal or 50 percent of maximum.

In a specific embodiment of the invention shown in FIG. 1 the discs 14 and 16 may be optical polarizing discs with the polarization of the areas 21 and 22 offset 90° with respect to each other as indicated by the arrows P1 and P2 and with polarization of the disc 16 aligned 45° (as indicated by the arrow P3) to each area 22 and 24 when no torque is exerted on the shaft 12.

In the embodiments of the invention shown in FIGS. 2 through 5 the shaft 12 and mounting components 18 and 20 are not shown so that other components may be seen more clearly.

With continued reference to FIG. 1, a light source 26 is mounted to direct light through both discs 16 and 14, and the light passing through the pair of discs is received by sensors 28 and 30. The sensors 28 and 30 are arranged in such a manner that the sensor 28 "sees" only light which passes through the disc 16 and the inner area 22 of the disc 14. The sensor 30 sees only light having passed through the disc 16 and the outer area 24 of the disc 14. As a result, separate signals are developed from light transmitted through the inner and outer areas.

It may be seen, that, as torque is applied to the shaft 12, the torsioning section 17 twists; and the light transmission control discs 16 and 14 are angularly displaced with respect to each other in proportion to the amount of torque applied. As the light controlling effects of the discs are complimentary through the inner and outer areas 22 and 24, the transmission through the inner area 22 is proportionately increased or diminished, depending upon rotational direction, while an equal but opposite effect occurs at the outer area 24. Thus, reciprocal signals are developed at the sensors 28 and 30 which are proportional to the applied torque.

Figure 6:
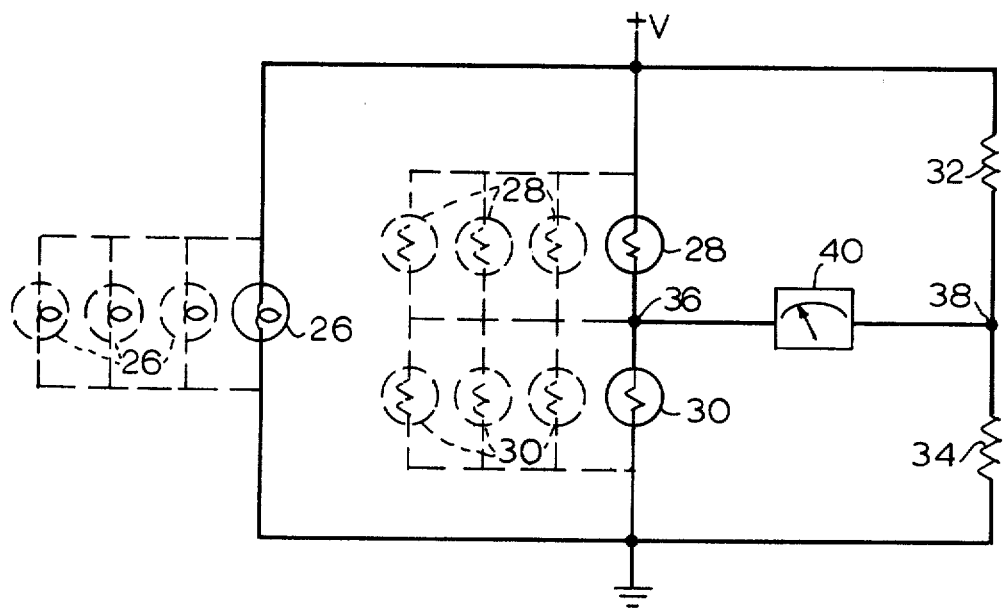
FIG. 6 is a functional schematic diagram showing electrical connection of light source(s) and photoresistive sensors for differential torque metering.

In one particular embodiment of the present invention, the sensors 28 and 30 are of the photoresistive type and are connected in series in one leg of a bridge circuit as illustrated in FIG. 6. The other leg of the bridge circuit includes two resistors 32 and 34 of approximately equal resistance value. In the bridge circuit, the voltage developed at point 36 between the photoresistors 28 and 30 is compared with the voltage at the divider point 38 between the resistors 32 and 34. It may be seen that, assuming equal initial light intensities on both sensors 28 and 30 with no torque applied, the voltages at points 36 and 38 will be equal. As torque is applied, the voltage at point 36 varies about that at point 38 in proportion to the amount of torque applied, and either positively or negatively according to the direction of the torque application. A center-null meter 40 is connected directly to these points 36 and 38 to read the direction and amount of torque applied. As a direct consequence of the differential and complimentary optical sensing utilized herein, the circuit, as shown, is largely immune to supply voltage variations, temperature, and aging effects.

In practice, the voltage at point 38 is made slightly adjustable (as with a variable potentiometer) to permit compensation for small differential variations in light intensity or sensor sensitivity at null, or to artifically induce a torque reading offset, if desired. Once so adjusted, however, the circuit remains stable thereafter. Such refinements of this circuit, or alternative circuits for these and other sensor and light source types, alternative output signals, indicators, or controls, or other adjustments, as for example, for sensitivity, may be easily implemented by those skilled in the art.

Figure 7:
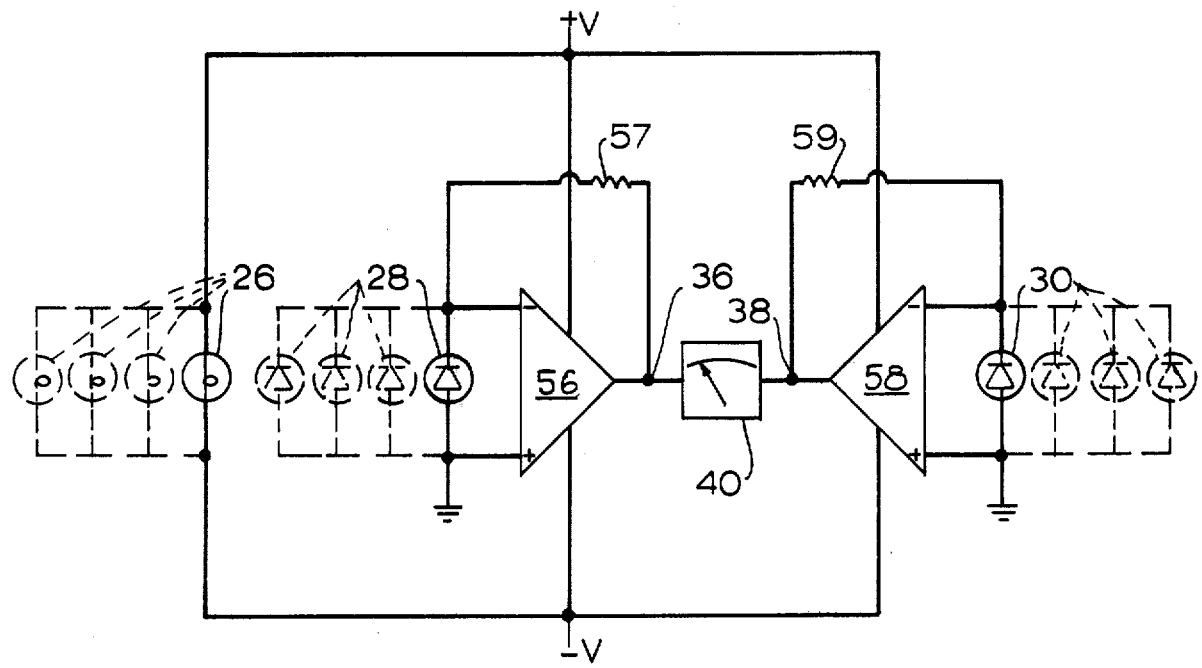
FIG. 7 is a similar diagram showing electrical connection of light source(s) and photo-voltaic sensors for differential torque metering.

In another particular embodiment of the present invention, the sensors 28 and 30 are of the photo-voltaic type, and are connected as shown in FIG. 7. Here, sensors 28 and 30 are connected to the separate inputs of operational amplifiers 56 and 58, respectively. The output voltage of the one amplifier 56 at point 36 is compared differentially with the output of the other amplifier 58 at point 38 to obtain the torque reading. Again, circuit refinements and modifications incorporating null, offset, and sensitivity adjustments, etc., will be apparent to those skilled in the art. The feedback resistors 57 and 59 serve to establish the transfer characteristic of this circuit.

In certain applications where high accuracy and/or linearity is required, it may be desirable to resrict torque-induced angular deflection of the optical transmission controlling discs to very small angles. In these applications, the embodiment of FIG. 1 may not be entirely satisfactory, as imperfections in the optical transmitting material introduce variations in optical transmission, and consequently in torque reading, as the discs rotate. This may appear as an undesirable noise component in the signal, and, where angular deflection is minimized to increase linearity, or, where high accuracy is desired, such variations may be intolerable. To minimize or effectively eliminate these noise components, increasingly large areas about the circles of the optical transmission controlling discs may be illuminated and detected, as shown in the following additional embodiments of the invention.

Figure 2:
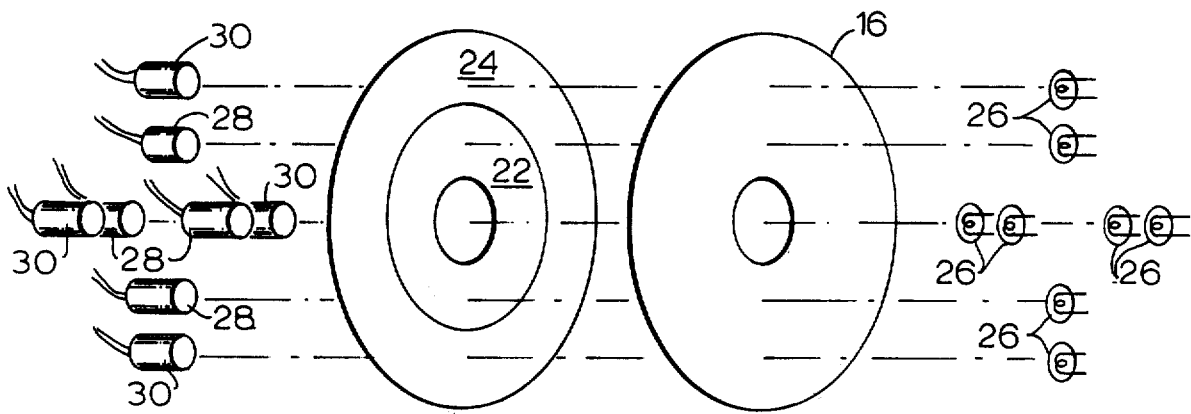
FIG. 2 is a similar view of a second embodiment utilizing multiple light sources and sensor pairs. The shaft and mounting means have been omitted for clarity.

FIG. 2 shows multiple light sources 26 and multiple sensors 28 and 30 (which may be mounted in pairs as illustrated) used to accomplish large area signal sampling. The sensors 28 are connected in parallel and the sensors 30 are connected in parallel (as indicated by the dashed outlines for the additional sensors 28 and 30 in FIGS. 6 and 7); and large area imperfections are self-cancelling.

Figure 3:
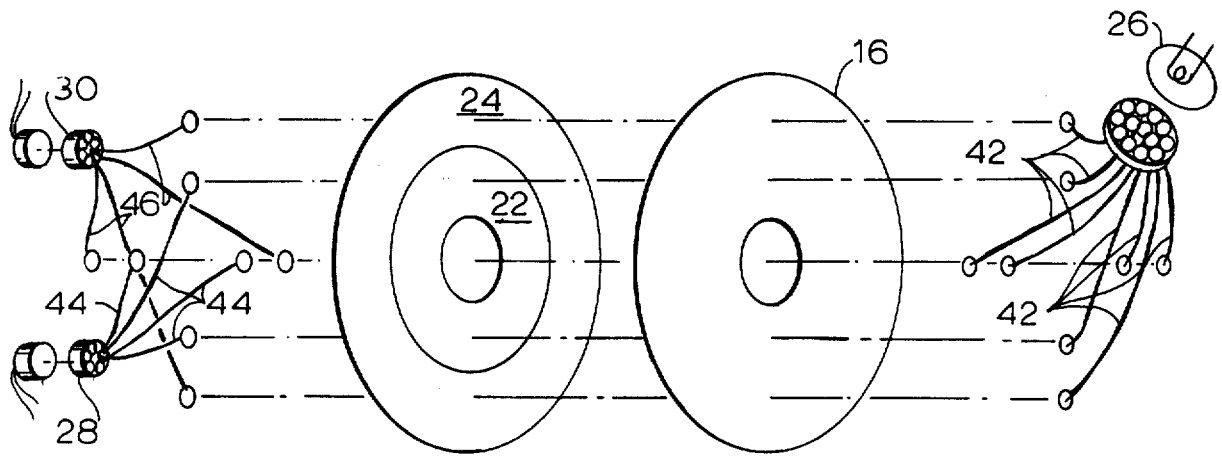
FIG. 3 is a similar view of a third embodiment utilizing a single light source and a single sensor pair with light distribution and collection via optical transmission means.

FIG. 3 shows an embodiment of the invention which incorporates optical distribution means 42 for the light source 26. FIG. 3 also incorporates optical collection means 44 for the sensor 28 and optical collection means 46 for the sensor 30. With a single light source 26 and a single sensor pair 28 and 30, as much as the complete circle of each of the complimentary optical transmission controlling areas 22 and 24 may be integrated at once, effectively eliminating noise components in the signal. Although fibre-optic bundles are specifically shown here, alternative optical transmission means such as edge-lit plastic rings might be incorporated.

Figure 4:
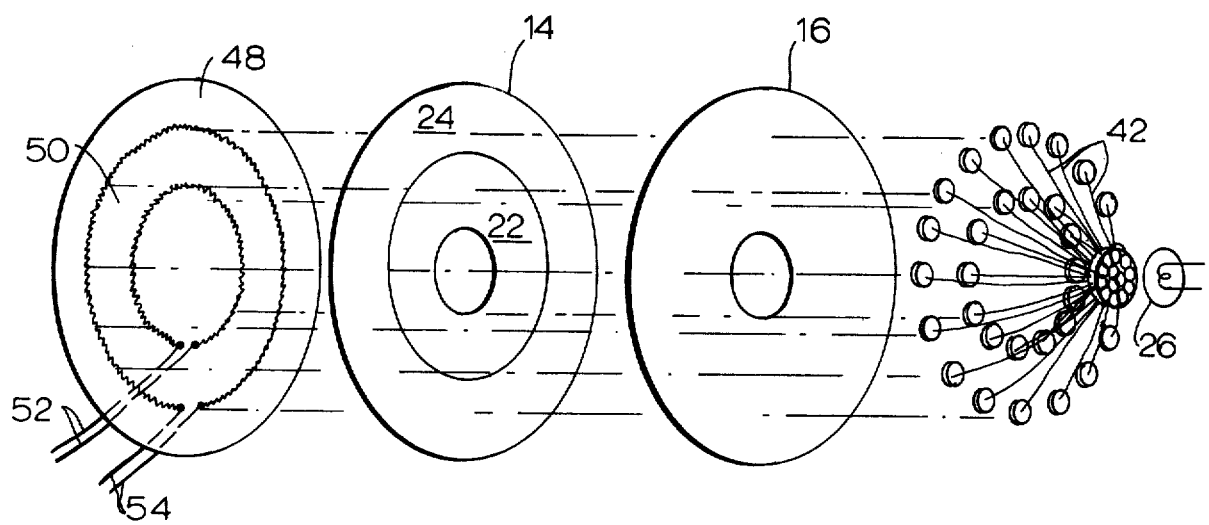
FIG. 4 is a similar view of a fourth embodiment utilizing a single light source distributed into two rings of light via optical transmission means and two ring-configuration light sensors.

In the FIG. 4 embodiment, ring-configuration sensors 48 and 50 sample virtually the entire circle of the two differential optical transmission controlling areas 22 and 24 of the disc 14. The FIG. 4 embodiment includes optical distributing means 42 which, as illustrated, divides the output of the single light source 26 and transmits it to the two optical transmission controlling areas 22 and 24.

In any of the embodiments described above, the differential optical transmission controlling discs 14 and 16 may be constructed of optical polarizing material. The one disc 14 comprises two rings, an inner ring 22 and an outer ring 24 with the polarization of the two rings offset 90 degrees with respect to each other as indicated by the arrows P1 and P2 in FIG. 1. The second disc 16 has a single polarization aligned 45 degrees (as indicated by the arrow P3 in FIG. 1) to each ring of the first disc 14 when no torque is applied to the shaft 12. Thus constructed, the discs 14 and 16 develop the desired differential optical effects in the torque transducer 10. The resultant signal, in itself, is a well known result, and is described in technical literature. See, for example, U.S. Pat. No. 3,474,255 to R. E. White.

Figure 5:
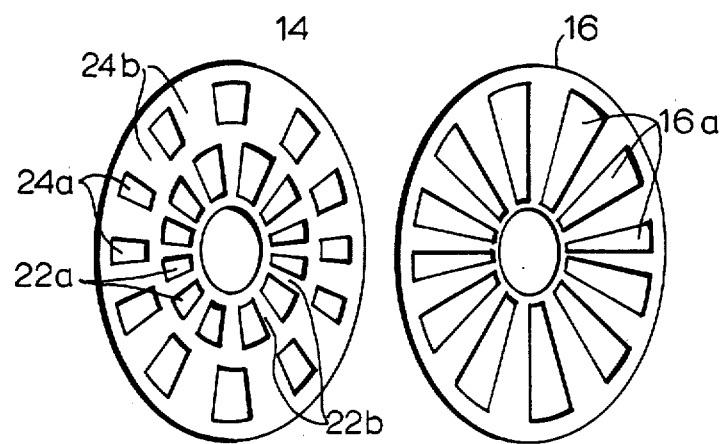
FIG. 5 is a similar view of another embodiment showing details of construction of light-controlling discs utilizing alternately occuring light-transmitting and opaque patterns.

The differential optical transmission controlling discs 14 and 16 might alternatively have a light-dividing pattern comprising a series of alternately occuring light-transmitting and opaque areas, as illustrated in FIG. 5. Here, only the discs 14 and 16 are shown, wherein the first disc 14 consists of an inner ring 22 of alternating transmitting areas 22a and opaque areas 22b and an outer ring 24 of alternating transmitting areas 24a and opaque areas 24b, the two rings being offset one area with respect to each other, that is, along a radius intersecting the center of a transmitting area 22a of the inner ring 22, lies the center of an opaque area 24b of the outer ring 24. The disc 16 comprises a single series of equally spaced alternating transmitting areas 16a aligned, at zero applied torque, such that they expose 50 percent of the transmitting and opaque areas of both inner and outer rings 22 and 24 of the other disc 14. It may be seen that, as the discs 14 and 16 are differentially rotated with respect to each other, complimentary differential optical transmission control occurs through disc 16 and the inner and outer rings 22 and 24 of disc 14.

The utilization of alternating transmitting and opaque areas for light controlling is well known in the art. See, for example, U.S. Pat. No. 3,495,452 to C. E. Johnson, et al. It should be noted here, however, that the utilization of the principle in a dual, complimentary differential mode as described in the present invention for torque sensing constitutes a significant improvement over the prior art in that it specifically results in immunity of the device to variations in light intensity, temperature, and aging, thereby eliminating the consequential necessity of frequent compensatory adjustments.

In particular applications, various combinations of the above embodiments, or alternatives thereto, may be found optimum. The specific embodiments shown here are not intended to encompass the entire scope of the invention, rather, they are examples of configurations which might usefully be implemented by those skilled in the art, to whom many changes in construction and widely differing embodiments and applications of the invention will suggest themselves. The disclosures and the description herein are purely illustrative and are not intended to be in any sense limiting.

The advantages of the present invention include the following:

1. In a relatively inexpensive and uncomplicated apparatus, non-linearity may be easily held within 0.1 percent of full scale without external compensation.

2. With sensors operated in a series bridge or differential configuration, many variations such as in temperature, light source intensity, applied voltage, aging, etc. are self-cancelling.

3. As differential optical effects are measured, no electrical connection with shaft-mounted components is required.

4. The system is suitable for both static and dynamic torque measurements.

5. The system is insensitive to mechanical misalignments or diaplacements other than torque-induced differential angular deflections.

6. Even over small deflection angles, the system has high sensitivity, and the signal output is sufficient in many applications not to require amplification.

7. Via simple and inexpensive refinements, high signal-to-noise ratios may be achieved.

8. The system is directionally sensitive, inherently differentiating clockwise and counterclockwise torques.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A torque transducer for measuring a torque in a shaft, said torque transducer comprising:
   a shaft;
   light transmission control means attached thereto and responding to torque stress induced therein, having,
   a first area of light transmission control and a second area of light transmission control responding in an equal but opposite manner to said torque stress;
   light source means mounted on one side of said light transmission control means;
   first and second photosensing and signal generating means mounted on the other side of said light transmission control means and oriented in such a manner as to separately and respectively receive light transmitted through each of said first and second areas thereof and to generate first and second signals respectively;
   differential circuit means connected to said photosensing and signal generating means and receiving said first and second signals and subtracting one from the other to provide a difference signal and a polarity corresponding to the greater of said first and second signals, and
   torque indicator means connected to said differential circuit means for receiving said difference signal and for indicating the amount and the direction of torques exerted on the shaft in response to the amount of light received by said photosensing means.

2. The invention defined in claim 1 wherein
   said light source means comprise multiple individual emitters and
   each of said first and second photosensing and signal generating means comprises a plurality of light receptors so disposed as to accomplish large area signal sampling,
   the light receptors being located in pairs, one from each said first and second means,
   the receptors of each said means being connected in parallel to said differential circuit means,
   whereby anomalies and noise are greatly reduced in their effect upon said differential signal.

3. The invention defined in claim 1 wherein said photosensing means comprise multiple photosensor parts disposed in a circle on said other side of said light transmission control means, thereby reducing undesirable noise components in said signals, thereby increasing the sensitivity of said transducer.

4. The invention defined in claim 1 wherein said light source means include optical transmission means for distributing the output of said light source means to a plurality of locations on said one side of said optical transmission control means and
   each said photosensing and signal generating means include optical transmission means for collecting light transmitted through said optical transmission control means from a plurality of locations on said other side of said optical transmission control means, thereby reducing the noise components of said signals.

5. The invention defined in claim 4 wherein said two photosensing means comprise two ring-configuration photosensors.

6. The invention defined in claim 1 wherein said differential circuit means comprise a bridge circuit having the photosensors connected in one leg of the bridge and fixed resistors connected in the other leg of the bridge, and said torque indicator means comprises an electrical meter connected across the two legs of the bridge to read the direction and amount of torque applied.

7. The invention defined in claim 6 wherein said first photosensing and signal-generating means include a first photosensor oriented to receive light through one of the two areas of the optical transmission control means and said second photosensing and signal-generating means include a second photosensor oriented to receive light transmitted through the other of the two areas of the optical transmission control means and wherein the first and second photosensors are connected in series in the first leg of the bridge circuit.

8. The invention defined in claim 6 wherein said first photosensing and signal-generating means include a plurality of first photosensors oriented to receive light transmitted through one of the two areas of the optical transmission control means and said second photosensing and signal-generating means include a plurality of second photosensors oriented to receive light transmitted through the other of the two areas of the optical transmission control means and wherein the first photosensors are connected in parallel and the second photosensors are connected in parallel and the first and second parallel combinations are connected in series in said first leg of the bridge to increase the signal-to-noise ratio of the signal developed by the photosensors.

9. The invention defined in claim 1 wherein said differential circuit means comprise a differential amplifier circuit having the photosensors connected to the two inputs thereof and said torque indicator means comprises an electrical meter connected across the output of said differential circuit means to read the direction and amount of torque applied.

10. The invention defined in claim 9 wherein said first photosensing and signal-generating means include a first photosensor oriented to receive light through one of the two areas of the optical transmission control means and said second photosensing and signal-generating means include a second photosensor oriented to receive light transmitted through the other of the areas of optical transmission control means and wherein the first and second photosensors are connected to the two inputs of the differential amplifier.

11. The invention defined in claim 9 wherein said first photosensing and signal-generating means include a plurality of first photosensors oriented to receive light transmitted through one of the two areas of the optical transmission control means and said second photosensing and signal-generating means include a plurality of second photosensors oriented to receive light transmitted through the other of the two areas of the optical transmission control means and wherein the first photosensors are connected in parallel and to one input of the differential amplifier and the second photosensors are connected in parallel and to the other input of the differential amplifier.

12. The invention defined in claim 1 wherein said light transmission control means include,
   first polarization means connected to a first location on the shaft and having two areas of polarization oriented 90 degrees with respect to each other, and,
   second polarization means connected to a second location on the shaft and having a single polarization oriented 45 degrees with respect to both areas of said first polarization means when no torque is exerted on the shaft.

13. The invention defined in claim 1 wherein said light transmission control means include, first light dividing means connected to a first location on the shaft having two rings of alternating transmitting and opaque areas with the transmitting areas in one ring offset one area with respect to the transmitting areas in the other ring, and second light dividing means connected to a second location on the shaft having alternating transmitting and opaque areas with the transmitting areas offset one-half area with respect to the transmitting area of both rings of said first light dividing means when no torque is exerted on the shaft.

14. Apparatus for detecting the direction and amount or rotation of a shaft and comprising:

a pair of polarization means including, first polarization means having two areas of polarization oriented 90° with respect to each other, and second polarization means having a single polarization oriented 45° with respect to both areas of said first polarization means in null or unrotated orientation of said pair of first and second polarization means;

light source means mounted on one side of said pair of polarization means;

first and second photosensing means mounted on the other side of said polarization means and oriented in such a manner as to separately and respectively receive light transmitted through each of the two areas of said first polarization means and the single polarization of said second polarization means;

said shaft being operatively associated with one of the first and second polarization means for rotating said one of the polarization means from said null position, circuit means connected separately to said first and second photosensing means and for generating an electrical signal proportional to the difference between the intensities of the light received by said first and second photosensing means, and indicator means in said circuit means for indicating, as a function of said signal the amount and direction of rotation of the shaft in response to the amount of light received by the photosensing means.

15. A method of measuring torque in a shaft, said method comprising, connecting a first polarizer disc to a first location on a shaft, said first polarizer disc having a first radially inner area of polarization and a second radially outer area of polarization with the first and second areas of polarization oriented 90° with respect to each other, connecting a second polarizer disc to a second location on the shaft, said second polarizer disc having a single polarization oriented 45° with respect to both areas of said polarizer disc when no torque is exerted on the shaft, mounting a light source on one side of said pair of polarizer discs, mounting photosensing means on the other side of said pair of polarizer discs, orienting the photosensing means in such a manner to separately receive light transmitted through each of the two areas of the first polarizer disc and the single polarization of the second polarizer disc, generating an electrical signal directly proportional to the difference in light intensity between the light transmitted through the two areas of the first polarizer disc, and reading the signal in terms of torque, thereby detecting the amount and direction of torques exerted on the shaft in response to the amount of light received by the photosensing means.

16. An instrument for measuring torque induced in a shaft coupled to torque-inducing means, including in combination:

first and second discs mounted on said shaft for rotation with said shaft and spaced apart from each other axially thereon by a torsioning portion of said shaft, said first disc having an inner first annular light transmission control means and an outer second annular light transmission control means, said first control means and said second control means responding in an equal but opposite manner to torque induced in said shaft, said second disc having a third annular light transmission control means at least equal in area to the sum of said first and second control means, light source means mounted for sending light through both said discs and through all three said light transmission control means, light sensing means mounted on the opposite side of said discs from said light source means and including first photosensitive means for receiving only the light passing through said first and third light transmission control means and generating a first electrical signal, and second photosensitive means for receiving only the light passing through said second and third light transmission control means and for generating a second electrical signal, differential circuit means connected to said first and second photosensitive means for providing a third electrical signal proportional to the difference between said first and second electrical signals, and torque indicating means for indicating, in terms of torque, both the magnitude and direction of said third signal, said differential circuit means tending to cancel out inaccuracies due to variations in temperature, light source intensity, applied voltage, and aging.

* * * * *